(12) United States Patent
Reasoner et al.

(10) Patent No.: US 6,693,858 B2
(45) Date of Patent: Feb. 17, 2004

(54) DATA CARTRIDGE DETECTOR

(75) Inventors: Kelly J. Reasoner, Ft Collins, CO (US); Richard A. Irwin, Fort Collins, CO (US); Gregg S. Schmidtke, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 09/814,236

(22) Filed: Mar. 21, 2001

(65) Prior Publication Data

US 2002/0136100 A1 Sep. 26, 2002

(51) Int. Cl.⁷ .............................................. G11B 21/08
(52) U.S. Cl. .................. 369/30.29; 369/30.32
(58) Field of Search .......................... 369/30.29, 30.3, 369/30.31, 30.32, 34.01, 75.2, 77.2, 75.1, 77.1; 360/99.06, 71

(56) References Cited

U.S. PATENT DOCUMENTS

| | | | |
|---|---|---|---|
| 5,099,465 A | 3/1992 | Geiger et al. | |
| 5,325,243 A | * 6/1994 | Rath et al. | 360/71 |
| 5,612,831 A | * 3/1997 | Gallo et al. | 360/71 |
| 6,104,693 A | 8/2000 | Coffin et al. | 369/34 |
| 6,144,521 A | 11/2000 | Egan et al. | |
| 6,160,786 A | 12/2000 | Coffin et al. | 369/178 |

FOREIGN PATENT DOCUMENTS

EP  0566351 A2  11/1998

* cited by examiner

*Primary Examiner*—Tan Dinh (57) ABSTRACT

An apparatus and method for detecting a data cartridge in a cartridge engaging assembly. A signal emitter may be positioned adjacent the cartridge engaging assembly to emit a signal. A signal detector mounted to the cartridge engaging assembly may detect the signal. The signal detector generates output to indicate whether the data cartridge is present in the cartridge engaging assembly based on the detected signal.

18 Claims, 5 Drawing Sheets

A signal detector may be mounted to the cartridge engaging assembly to detect a signal from the signal emitter. The

DATA CARTRIDGE DETECTOR

FIELD OF THE INVENTION

The invention relates generally to media storage systems for handling and storing data cartridges, and more specifically, to a data cartridge detector for use therewith.

BACKGROUND OF THE INVENTION

Media storage systems are well known in the art and are commonly used to store data cartridges at known locations and to retrieve the desired data cartridges so that data may be written to and/or read from the data cartridges. Such media storage systems are often referred to as autochangers or library storage systems.

A typical autochanger or media storage system may include one or more different types of cartridge-receiving devices for holding the various data cartridges. For example, one type of cartridge-receiving device may comprise an individual cartridge storage location (e.g., for holding a single data cartridge) or a cartridge storage rack or "magazine" (e.g., for holding a plurality of data cartridges). The cartridge storage location or racks serve to provide storage locations for the data cartridges and are commonly arranged so that they form one or more vertical stacks, although other arrangements are possible. Another type of cartridge-receiving device may comprise one or more cartridge read/write devices for reading data from and/or writing data to the data cartridges contained in the autochanger. The cartridge read/write device(s) may be located at any convenient position within the media storage system.

The autochanger or media storage system may also be provided with a cartridge handling system for transporting the data cartridges between the various cartridge-receiving devices. For example, the cartridge handling system may transport the data cartridges between the cartridge storage location or racks and the cartridge read/write device. A typical cartridge handling system may include a cartridge engaging assembly or "picker" for engaging the various data cartridges contained in the cartridge-receiving devices. In addition, the cartridge handling system also typically includes a positioning device for moving the cartridge engaging assembly among the various cartridge-receiving devices.

Autochangers or media storage systems of the type described above are usually connected to a host computer system which may access or store data on the data cartridges. For example, if the host computer system issues a request for data contained on a particular data cartridge, a control system associated with the autochanger actuates the positioning system to move the cartridge engaging assembly along the cartridge storage locations until the cartridge engaging assembly is positioned adjacent the desired data cartridge. The cartridge engaging assembly may then remove the data cartridge from the cartridge storage location and carry it to the cartridge read/write device. Once properly positioned adjacent the cartridge read/write device, the cartridge engaging assembly may insert the selected data cartridge into the cartridge read/write device so that the host computer may thereafter read data from or write data to the data cartridge. After the read/write operation is complete, the cartridge engaging assembly may remove the data cartridge from the cartridge read/write device and return it to the appropriate cartridge storage location.

In use, it is often necessary to know whether a data cartridge is present in the cartridge engaging assembly. At start-up, for example, it is necessary to know whether there is already a data cartridge in the cartridge engaging assembly. If a data cartridge is already present in the cartridge engaging assembly, the data cartridge may first need to be returned to an appropriate cartridge-receiving device before the media storage system will be ready for service. In addition, if a data cartridge is to be retrieved from a cartridge-receiving device, it is necessary to know whether the data cartridge was successfully engaged before moving the cartridge engaging assembly to the read/write device for access thereto, or whether another attempt is required to successfully engage the data cartridge.

One solution for determining whether a data cartridge is present in the cartridge engaging assembly is to position the cartridge engaging assembly at one of the read/write devices, and unload the contents, if any, into the read/write device. The read/write device may then be used to read the data cartridge to determine whether there was indeed a data cartridge present in the cartridge engaging assembly. Where the read/write device is unable to read and/or write to the data cartridge, this may indicate that the cartridge engaging assembly was empty. However, it may also indicate that the unload was unsuccessful, and that the data cartridge is still in the cartridge engaging assembly. In addition, according to this solution an unsuccessful retrieval goes undetected until the cartridge engaging assembly is positioned at the read/write device and there is nothing to unload. Thus, the cartridge engaging assembly must return to the cartridge storage location or rack and again attempt to retrieve the data cartridge.

Another solution is to provide a mechanical switch within the cartridge engaging assembly. As such, when a data cartridge passes into or out of the cartridge engaging assembly, the switch is thrown (e.g., "on" or "off"). As such, the switch position indicates whether a data cartridge is present within the cartridge engaging assembly. However, mechanical switches have finite tolerances. For example, a slightly smaller data cartridge may pass into or out of the cartridge engaging assembly without triggering the switch. In addition, mechanical switches are prone to physical wear. As such, the switch may provide false information, indicating that a data cartridge is present when it is not, or vice versa.

Yet another solution is to provide the cartridge engaging assembly with suitable servo-electronics, and a known object against which the cartridge engaging assembly attempts to unload its contents, if any. As the cartridge engaging assembly attempts to unload against the known object, the opposing force is measured. Where a data cartridge is present within the cartridge engaging assembly, the opposing force is greater than when the cartridge engaging assembly is empty, thus indicating the presence of a data cartridge therein. However, this solution requires expensive and sensitive servo-electronics that are capable of measuring and processing the opposing forces. In addition, it is time consuming to position the cartridge engaging assembly adjacent the known object, perform the test, and process the results.

SUMMARY OF THE INVENTION

System and apparatus for determining the presence of a data cartridge in a cartridge engaging assembly according to one embodiment of the invention may comprise a signal emitter positioned adjacent the cartridge engaging assembly. A signal detector may be mounted to the cartridge engaging assembly to detect a signal from the signal emitter. The signal detector generates output to indicate whether a data cartridge is present in the cartridge engaging assembly based on the detected signal.

Also disclosed is a method for determining the presence of a data cartridge in a cartridge engaging assembly that may comprise the steps of: emitting a signal into the cartridge engaging assembly; detecting the emitted signal; and generating output to indicate whether the data cartridge is present in the cartridge engaging assembly based on the detected signal.

BRIEF DESCRIPTION OF THE DRAWINGS

Illustrative and presently preferred embodiments of the invention are illustrated in the drawings, in which.

DESCRIPTION OF THE PREFERRED EMBODIMENTS

Figure 1:
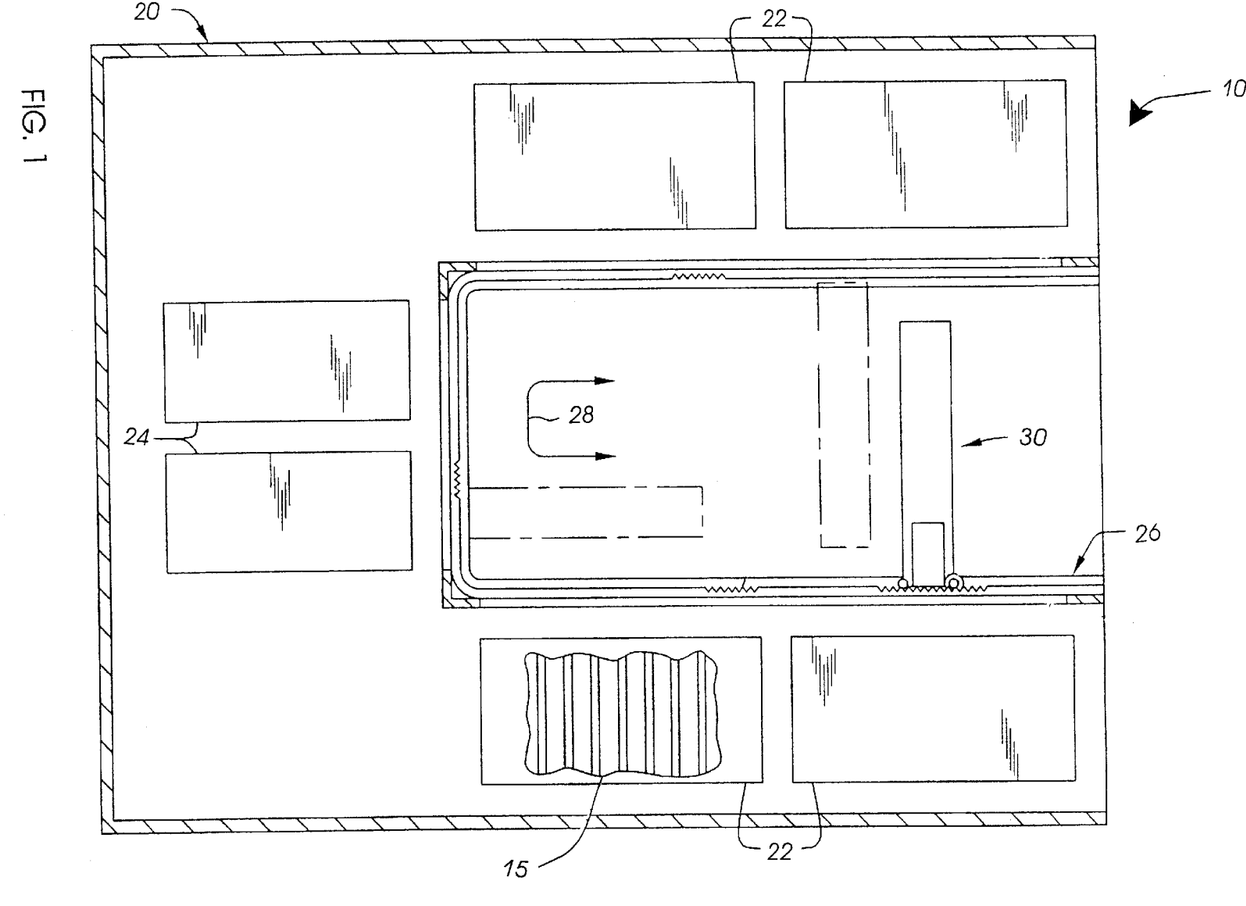
FIG. 1 is a plan view of a media storage system that utilizes the apparatus for detecting a data cartridge according to one embodiment of the invention.

Apparatus 10 for detecting a data cartridge 15 is shown and described herein as it could be used with an autochanger or media storage system 20 (see FIG. 1). Briefly, media storage systems 20 are used to store large volumes of computer readable data. The computer readable data is typically stored on multiple data cartridges 15 that are arranged in one or more cartridge-receiving devices of the media storage system 20 (e.g., in storage magazines 22, read/write devices 24). The media storage system 20 may include a cartridge engaging assembly 30 that can be moved among the cartridge-receiving devices and positioned adjacent a data cartridge 15 therein.

It is often necessary to know when a data cartridge 15 is present in the cartridge engaging assembly 30. For example, it may be necessary to know whether a data cartridge 15 is present when the media storage system 20 is powered-up. Or for example, it may be necessary to know whether a data cartridge 15 was successfully engaged (e.g., for retrieval from the cartridge-receiving device), or disengaged (e.g., for unloading). In addition, it may also be necessary or desirable to know the characteristics (e.g., the color, type, etc.) of the data cartridge 15 that is present within the cartridge engaging assembly 30. For example, a white cartridge for cleaning the read/write heads of the read/write device 24 may be present in the cartridge engaging assembly 30. The present invention relates to such a method and apparatus for detecting the presence of a data cartridge 15 in the cartridge engaging assembly 30. Also according to the invention, the characteristics of the data cartridge 15 may also be determined.

Figure 3:
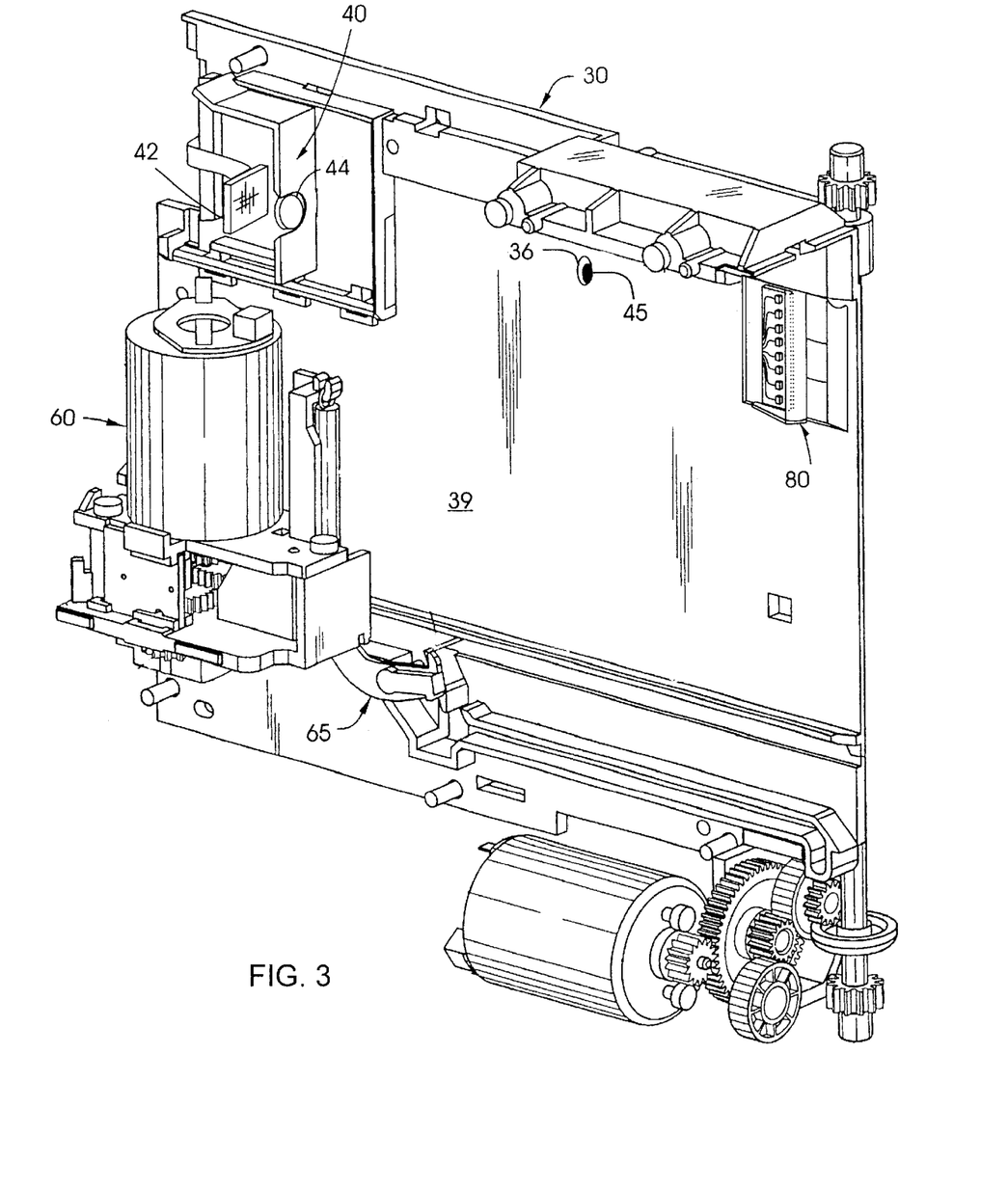
FIG. 3 is a partial perspective view of the cartridge engaging assembly with one side removed to show an exemplary signal detector therein.

According to the teachings of the invention, a signal detector 40 may be mounted to the cartridge engaging assembly 30, and a signal emitter 45 may be positioned adjacent the cartridge engaging assembly 30 (see FIG. 3). As such, the apparatus may be operated to detect at least a portion of the emitted signal 50 at the signal detector 40 and generate output to indicate whether the data cartridge 15 is present in the cartridge engaging assembly 30 (see FIG. 4 and FIG. 5).

The apparatus 10 may be operated as follows to detect a data cartridge 15 within the cartridge engaging assembly 30 (see FIG. 4 and FIG. 5). A signal 50 is emitted into the cartridge engaging assembly 30, for example, using the signal emitter 45. The signal 50 may be reflected from the data cartridge 15 and be detected, for example, using the signal detector 40. Once the signal 50, or a portion thereof, has been detected, output to indicate whether the data cartridge 15 is present in the cartridge engaging assembly 30 may be generated (e.g., by the signal detector 40) based on the detected signal 50.

Accordingly, the presence of a data cartridge 15 within the cartridge engaging assembly 30 is determined without having to first position the cartridge engaging assembly 30 at one of the read/write devices 24. In addition, neither mechanical switches nor dedicated servo-electronics are required according to the teachings of the invention. Furthermore, the invention may be used with any data cartridge 15, regardless of whether a bar code label is used with the data cartridge 15.

Having generally described apparatus and methods for detecting a data cartridge 15 when the same is present within the cartridge engaging assembly 30, and several advantages thereof, several embodiments of the invention will now be described in further detail.

The apparatus 10 for detecting a data cartridge 15 may comprise an autochanger or media storage system 20 such as that shown in FIG. 1. The media storage system 20 includes one or more data cartridges 15 arranged in one or more cartridge-receiving devices (e.g., storage magazine 22, read/write device 24, a mail slot (not shown), etc.). In use, a control system (not shown) associated with the media storage system 20 moves a cartridge engaging assembly 30 (i.e., a "picker" and a positioning device) along a positioning rail 26. The cartridge engaging assembly 30 may thus be moved adjacent the cartridge-receiving device(s) to access and deliver the data cartridge(s) 15 according to requests by a host computer (not shown) suitably linked to the media storage system 20 (e.g., via a direct connection, remote connection, network connection, etc.).

As an illustration of the use of the media storage system 20, the host computer may issue a request to access a data cartridge 15 stored in one of the storage magazines 22 to read and/or write data thereto. In response, the control system moves the cartridge engaging assembly 30 along the positioning rail 26 (i.e., in the directions of arrow 28). The control system positions the cartridge engaging assembly 30 adjacent the requested data cartridge 15. Once positioned, the control system signals the cartridge engaging assembly 30 to withdraw the data cartridge 15 from the storage magazine 22 and to carry it to the read/write device 24 where the linked computer can read and/or write computer readable data thereon.

Figure 2:
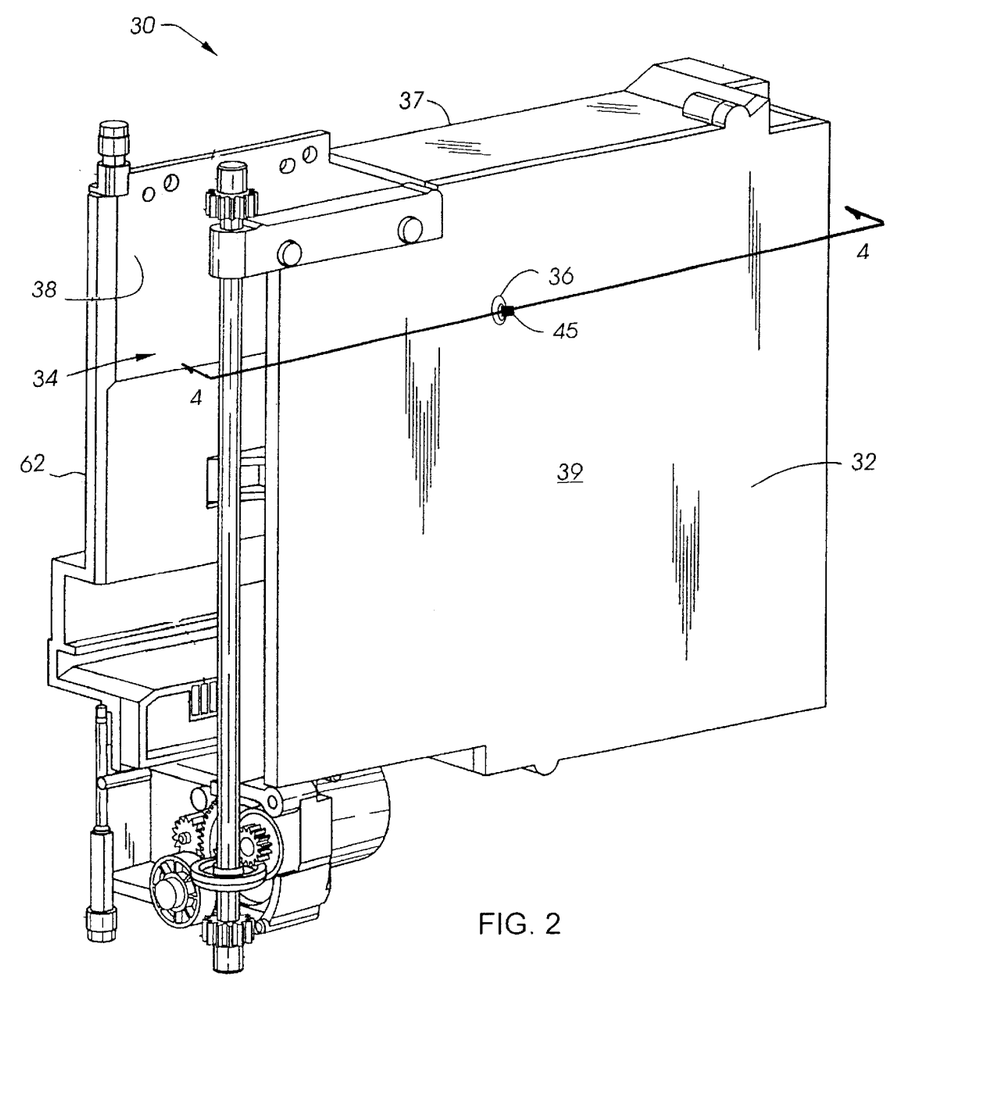
FIG. 2 is a perspective view of a cartridge engaging assembly of the media storage system with the computer board removed to show an exemplary signal emitter positioned thereon.

An exemplary cartridge engaging assembly 30, for use with the media storage system 20, is shown in FIG. 2. The cartridge engaging assembly 30 is adapted to: 1) engage a data cartridge 15 contained in a cartridge-receiving device (e.g., storage magazine 22); and then 2) draw the data cartridge 15 into the cartridge engaging assembly 30 for transport to a different cartridge-receiving device (e.g., read/write device 24). The cartridge engaging assembly 30 may comprise a frame assembly 32 (e.g., sides 37, 38, 39) that defines a chamber or cavity 34 sized to receive the data cartridge 15 therein (e.g., for carrying it to the read/write device 24). Also in FIG. 2, the computer board 70 (FIG. 4 and FIG. 5) has been removed to show the signal emitter 45 positioned adjacent the cartridge engaging assembly 30. The signal emitter 45 is provided for projecting a signal 50 (see FIG. 4 and FIG. 5) through an aperture 36 formed in the cartridge engaging assembly 30, according to the teachings of the invention as described in more detail below.

FIG. 3 is a partial perspective view of the cartridge engaging assembly 30 with one side 38 removed to show the interior of the chamber 34 formed by the frame assembly 32. A cartridge plunge mechanism 60 is slidably mounted to the frame assembly 32 so that the cartridge plunge mechanism 60 may be moved toward (i.e., extended) and away (i.e., retracted) from the cartridge access end 62 of the frame assembly 32. The cartridge plunge mechanism 60 may also be provided with a finger assembly 65 configured to engage the data cartridge 15. The finger assembly 65 allows the cartridge plunge mechanism 60 to engage and withdraw the data cartridge 20 from the cartridge-receiving device(s) when so requested. Movement of the cartridge engaging assembly 30 may be achieved via an actuator system that moves the cartridge engaging assembly 30 along the U-shaped path of the cartridge positioning system 26.

The foregoing description of the media storage system 20 and cartridge engaging assembly 30 is provided in order to better understand one environment in which the invention may be used. However, it should be understood that the invention may be used in any of a wide range of other types of media storage systems, and in conjunction with any of a wide range of cartridge engaging assemblies now known or that may be developed in the future. Consequently, the invention should not be regarded as being limited to use with the particular media storage system 20 and cartridge engaging assembly 30 shown and described herein. Also, since detailed descriptions of the media storage system 20 and the cartridge engaging assembly 30 are not required to understand or practice the invention, these will not be described in further detail herein.

In order to determine whether the cartridge engaging assembly 30 is empty and therefore ready for use (e.g., to retrieve and deliver a data cartridge 15), or to determine whether a data cartridge 15 has been successfully engaged and/or unloaded, it may be necessary to detect when a data cartridge 15 is present in the cartridge engaging assembly 30. As such, the cartridge engaging assembly 30 may be provided with a signal emitter 45 and a signal detector 40. The signal detector 40 may generate output indicating whether the data cartridge 15 is present within the cartridge engaging assembly 30 based on the signal 50 detected thereby, as explained in more detail below.

Figure 4:
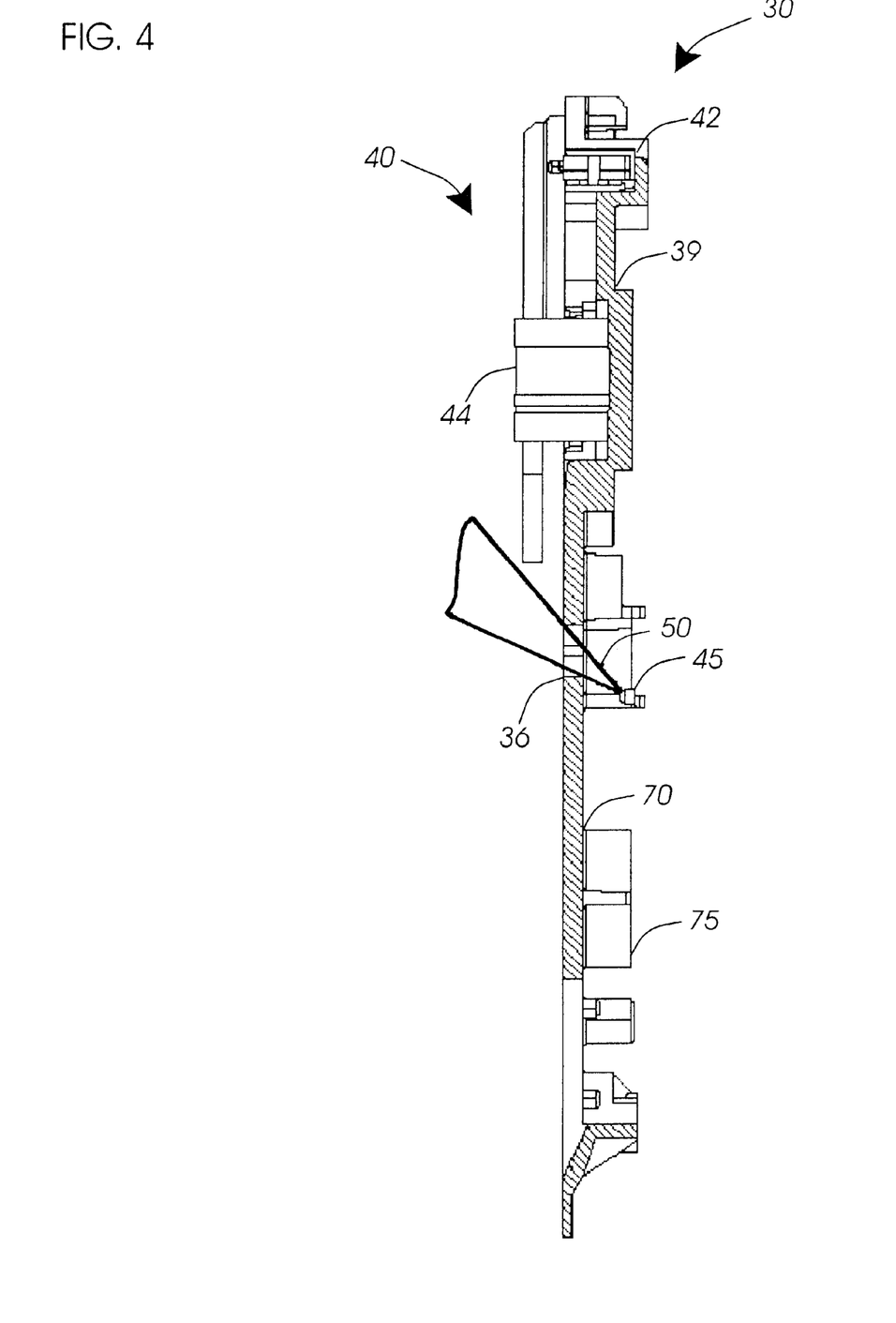
FIG. 4 is a simplified, partial cross-section view of the cartridge engaging assembly taken along line 4—4 in FIG. 2, illustrating the path of an emitted signal when the cartridge engaging assembly is empty.
Figure 5:
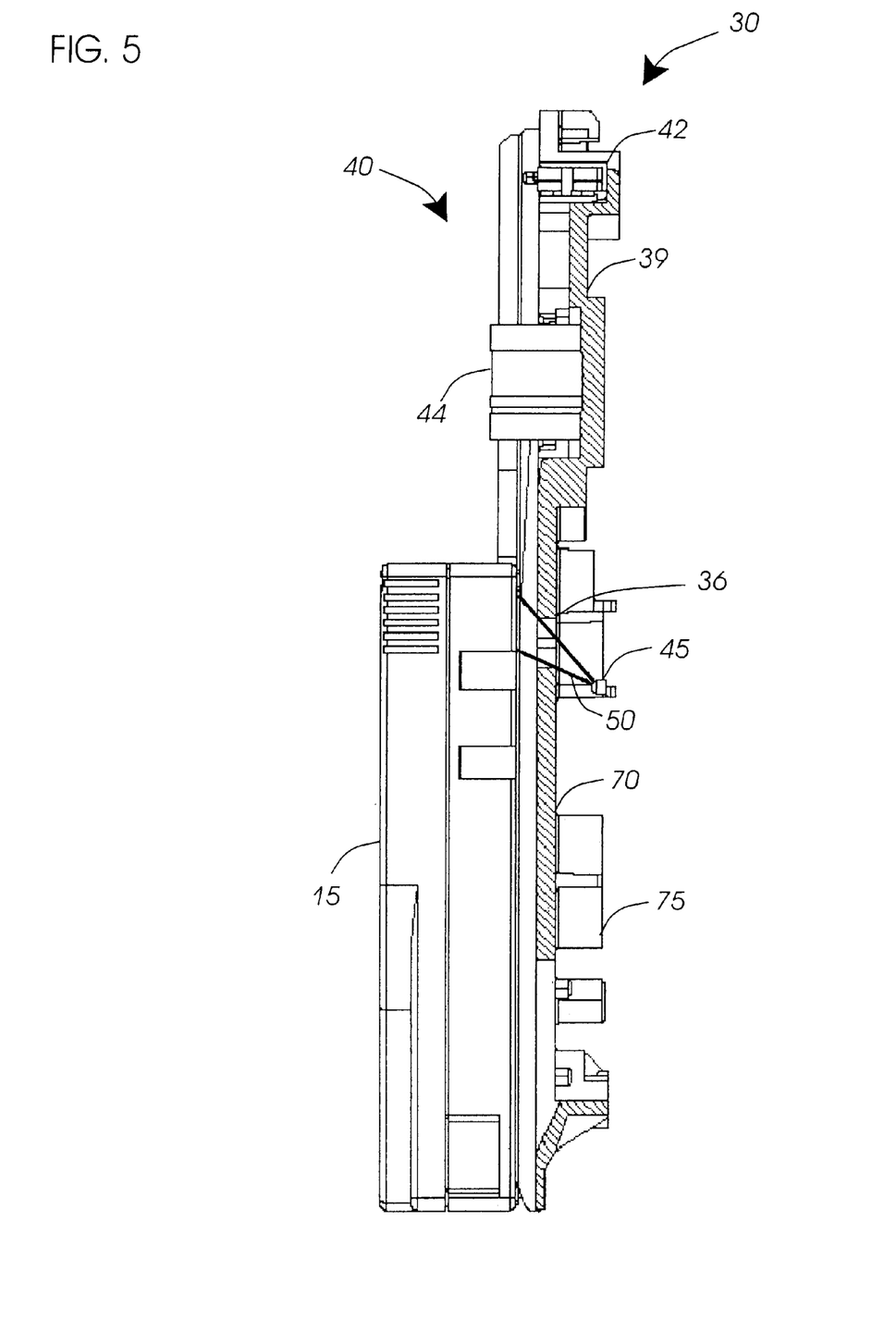
FIG. 5 is a simplified, partial cross-section view of the cartridge engaging assembly, as in FIG. 4, illustrating the path of an emitted signal when a data cartridge is present therein.

A signal emitter 45 may be positioned adjacent the cartridge engaging assembly 30, as shown in FIG. 2, such that a signal 50 is projected through an aperture 36 formed in the cartridge engaging assembly 20 and into the chamber 34 thereof (see FIG. 4 and FIG. 5). Preferably, the signal emitter 45 is mounted to a computer board 70 that is provided to control various functions of the cartridge engaging assembly 30, such as those explained above. As such, additional circuitry and/or wiring need not be provided, such as may be required when the signal emitter 45 is mounted to one of the other sides (e.g., opposing side 38) of the cartridge engaging assembly 30. In addition, by mounting the signal emitter 45 external to the cartridge engaging assembly 30, the signal 50 does not "flood" the chamber 34 which may result in erroneous detection by the signal detector 40. That is, the signal 50 is shielded from the signal detector 40 when the cartridge engaging assembly 30 is empty, as explained in more detail below.

In a preferred embodiment, the signal emitter 45 is a light source. For example, the signal emitter 45 may be a light emitting diode (LED). However, it is understood that the signal emitter 45 is not limited thereto, and may comprise, for example, a plurality or an array of LEDs that emit light through an optional lens, not shown. Or for example, the signal emitter 45 may be an incandescent light source, a sodium vapor light, an Indiglo® light, a fluorescent light, a laser beam, etc. Likewise, it is understood that any suitable wavelength signal may be used. For example, the signal may be infrared (IR), visible, ultraviolet (UV), etc. Indeed, the emitted signal 50 need not be a light signal, and in another embodiment, for example, the signal 50 may be an audio signal.

It is understood that although the signal emitter 45 is preferably connected to the computer board 70, the signal emitter 45 may be variously positioned adjacent the cartridge engaging assembly 30 according to the teachings of the invention. For example, the signal emitter 45 may be mounted within the chamber 34 of the cartridge engaging assembly 30 (not shown), wherein the aperture 36 need not be provided. In such an embodiment, a lens for focusing the emitted signal 50, or means for otherwise shielding the signal 50, may be required so that the signal 50 does not "flood" the chamber 34. Or for example, the signal emitter 45 may be mounted within the aperture 36. Indeed, the signal emitter 45 may be provided as part of the bar code signal source 80. For example, one or more of the LEDs in the array of LEDs of the bar code signal source 80 may be directed to project a signal 50 onto the surface of the data cartridge 15 for detection by the signal detector 40. In other embodiments, the signal emitter 45 positioned adjacent the cartridge engaging assembly 30 by directly mounting it to the lid 39 or otherwise to the frame assembly 32, or using a flex cable, a cable to board assembly, or connected to a separate board altogether that is mounted adjacent the cartridge engaging assembly 30.

The signal detector 40 is mounted to the cartridge engaging assembly 30, as shown in FIG. 3, such that it is senses or detects the signal 50 projected by the signal emitter 45 to indicate the presence (or absence of) a data cartridge 15 in the cartridge engaging assembly (see FIG. 4 and FIG. 5). Preferably, the signal detector 40 is mounted within the chamber 34 to the frame assembly 32 (e.g., the lid 39) of the cartridge engaging assembly 30. In addition, the signal detector 40 is also preferably mounted such that it can also be used as a bar code reader to read bar code labels attached to the data cartridges 15. An exemplary bar code reader for reading bar code labels that are applied to data cartridges 15 is disclosed in U.S. patent application Ser. No. 09/716,878, entitled "Dual Bar Code Reading System for a Data Storage System". As such, much, if not all of the circuitry already provided for the bar code reader can be used to detect the signal 50 according to the teachings of the invention.

One way in which the signal detector 40 may sense or detect the signal 50 is via a light sensor. For example, the signal detector 40 may comprise a charge coupled device (CCD) 42 (e.g., NEC Inc., Part No. uPD3734A). Preferably, the CCD 42 is a linear CCD or an array of CCDs. As such, the CCD 42 can be leveraged for use with this invention from the bar code reader that may be provided to detect and interpret a bar code label or the like that may be applied to the data cartridge 15 (e.g., for identifying the data cartridge 15). It is understood, however, that the signal detector 40 may comprise any of a wide range of CCD and/or other sensor types that are well-known in the art and that are readily and commercially available, such as, but not limited to a photo transistor. It is also understood that depending on where the signal detector 40 is mounted, the signal detector 40 may also comprise a lens 44 or lenses for aligning and/or focusing the signal 50 (or a portion thereof) onto a device such as the aforementioned CCD 42.

It is understood that the signal detector 40 and the signal emitter 45 may be variously positioned on the cartridge engaging assembly 20. For example, the signal detector 40 and the signal emitter 45 may be mounted to any of the sides (e.g., 37, 38, 39) of the frame assembly 32. The signal detector 40 may also be mounted within the chamber 34 or external thereto, wherein suitable aperture(s) and lens(es) may also be provided, when so required. Also for example, the signal detector 40 and the signal emitter 45 may be mounted to reflect the signal 50 from any surface of the data cartridge 15, and in any direction. In addition, it is understood that the signal detector 40 may be an altogether separate detector, or portion thereof, from the bar code reader. For example, the signal detector 40 may include a separate lens (not shown) for directing the signal 50 to the CCD 42. Or for example, the signal detector 40 may include both a separate lens and a separate CCD (not shown) from those of the provided bar code reader.

It is also understood that the signal detector 40 and the signal emitter 45 may be activated for any suitable period. For example, the signal emitter 45 may be activated during the entire time that the media storage system 20 is powered on, activated only when the cartridge engaging assembly 30 is in use, activated when a request to make a determination about the contents thereof is made, etc.

A simplified, partial cross-section view of the cartridge engaging assembly 30 is shown in FIG. 4 taken along line 4—4 in FIG. 2. FIG. 4 illustrates the path of the signal 50 when the cartridge engaging assembly 30 is empty (i.e., the data cartridge 15 is not contained therein). The signal emitter 45 projects the signal 50 through the aperture 36 formed in the cartridge engaging assembly 30 and into the chamber 34 formed therein. When the cartridge engaging assembly 30 is empty, the signal 50 is projected across the chamber 34 where it may be absorbed by the side 38 of the cartridge engaging assembly 30, reflected elsewhere within the cavity 34, or otherwise dissipated. However, the signal detector 40 preferably does not detect the signal 50 when the cartridge engaging assembly 30 is empty. As such, the signal detector 40 generates output indicating whether the data cartridge 15 is present therein based on the detected signal 50 (i.e., no signal is detected).

The signal detector 40 may include or be combined with a processor 75 for assessing the detected signal 50. For example, the signal detector 40 may comprise computer readable program code (e.g., a routing and/or subroutine) executable by the processor 75. The processor 75, according to the program code, may receive the output from the signal detector 40 and determine the presence of the data cartridge 15 in the cartridge engaging assembly 30. For example, in the above illustration where no signal is detected, the processor 75 interprets such output from the signal detector 40 to indicate an empty cartridge engaging assembly 30.

It is understood that the processor 75 may be included as part of the signal detector 40, or the processor 75 may be a separate component that is combined with the signal detector 40. In addition, the processor 75 may be already provided (e.g., as control firmware, the host computer, etc.). However, it is understood that the processor 75 may be any suitable processor (e.g., a Motorola 68000 series processor, an Intel PENTIUM® series computer processor), and may be separately provided and dedicated to the data cartridge detection system.

A simplified, partial cross-section view of the cartridge engaging assembly 30 is shown in FIG. 5 taken along line 4—4 in FIG. 2 illustrating the path of the signal 50 when a data cartridge 15 is present within the cartridge engaging assembly 30. Again, the signal emitter projects the signal 50 through the aperture 36 formed in the cartridge engaging assembly 30 and into the chamber 34 formed therein. However, when a data cartridge 15 is contained therein, the signal 50 is projected onto a surface of the data cartridge 15, where it is reflected and/or scattered back toward the signal detector 40. The signal detector 40 detects at least a portion of the reflected and/or scattered signal 50. The signal detector 40 also generates output to indicate whether the data cartridge 15 is present therein based on the detected signal 50 (i.e., indicating that the data cartridge 15 is present). Again, preferably the processor 75 receives the output from the signal detector 40 and determines the presence of the data cartridge 15 in the cartridge engaging assembly 30. For example, according to this embodiment where at least a portion of the emitted signal 50 is detected, the processor 75 interprets such output from the signal detector 40 to mean that a data cartridge 15 is present within the cartridge engaging assembly 30.

Accordingly, the invention may be used to determine the presence and/or absence of a data cartridge 15 in the cartridge engaging assembly 30. For example, at start-up the signal emitter 45 may project a signal 50 into the chamber 34 of the cartridge engaging assembly 30. The signal 50, or a portion thereof, may be reflected and/or scattered from the data cartridge 15 and hence detected by the signal detector 40. The signal detector 40 may then generate output indicating the presence of the data cartridge 15 in the cartridge engaging assembly 30. That is, the output indicates whether the data cartridge 15 is present or absent from the cartridge engaging assembly 30. If a data cartridge 15 is already present in the cartridge engaging assembly 30, the data cartridge 15 may be returned to an appropriate cartridge-receiving device (e.g., storage magazine 22, read/write device 24) before making use thereof. Likewise, the invention may also be used to determine if a data cartridge 15 was successfully engaged, whether a data cartridge 15 was successfully unloaded into the cartridge-receiving device, or where it is otherwise desirable to know whether a data cartridge 15 is present within, or absent from, the cartridge engaging assembly 30.

According to the teachings of the invention, the signal detector 40 may also detect and/or measure one or more characteristics of the data cartridge 15 (e.g., whether it has a smooth, rough, shiny, or dull surface) based on the detected signal 50. It is understood that one or more signal detectors and/or signal emitters may also be provided for characteristic detection. For example, additional and/or dedicated components may increase the accuracy where the data cartridges 15 are various shades of color, or provide such functionality where the signal detector 40 and/or signal emitter 45 may not be used for such a determination.

As an illustration, a color-deciphering component (e.g., suitable wavelength detection and measurement hardware and the related program code, where necessary) may be provided to determine the color of the data cartridge 15 that is present within the cartridge engaging assembly 30. The color may be determined by measuring the wavelength of the detected signal 50 that is reflected from the surface of the data cartridge 15. In addition, the color of the data cartridge 15, as determined by the color-deciphering component, preferably corresponds to a type of data cartridge. For example, a white data cartridge 15 may be a cleaning cartridge for cleaning the read/write heads in the read/write device 24.

It is understood that the signal emitter 45 and the signal detector 40, and the arrangement thereof, that have been shown and described above are provided merely as exemplary embodiments, and are not intended to limit the scope of the invention thereto. In another embodiment, for example, the signal detector 40 may constantly receive a portion of the signal 50 that is emitted from the signal emitter 45. However, according to this embodiment, the presence of a data cartridge 15 in the chamber 34 is determined based on the strength of the signal 50 that is sensed or detected by the signal detector 40. For example, a weak signal may indicate an empty chamber 34, whereas a stronger signal may indicate the presence of a data cartridge 15 (i.e., where the signal strength is at least equal to a predetermined threshold). In yet another embodiment, for example, the signal emitter 45 may be a light source and the signal detector 40 may be a photo-detector arranged so that the light source projects light across the interior of the chamber 34 where it is sensed by the photo-detector. Hence, light detected by the photo-detector indicates an empty cartridge engaging assembly 30, whereas an interrupted signal indicates the presence of a data cartridge 15 therein.

It is also understood that the angle of incidence need not equal the angle of reflection. In fact, when the surface of the data cartridge 15 is diffuse, it may only be necessary to tend to make the angle of incidence equal to the angle of reflection without having to actually achieve equivalence thereof. Preferably, the signal emitter 45 is mounted in the plan of the computer board 70 with the angle of incidence less than ninety degrees with respect to the reflective surface of the data cartridge 15, while still providing a detectable signal at the signal detector 40. It is understood that the characteristics of the aperture 36, the signal emitter 45, and the signal detector 40 can be readily determined based on design considerations, such as the placement of each component, the signal strength, the type of signal used, etc.

It should further be noted that although the apparatus and method of the invention is illustrated using a particular media storage system 20, the teachings of the invention may be utilized in any of a wide range of media storage systems now known in the art or that may be developed in the future. Accordingly, the invention should not be regarded as limited to the particular media storage system 20 shown and described herein. It should also be noted that while the media storage system 20 is shown and described herein as it could be used to store and retrieve a linear tape open (LTO) data cartridge having a standard size and configuration, it is not limited to any particular type or style of data cartridge. Indeed, the invention disclosed herein could be used with any type of storage medium (e.g., magnetic disk or tape, optical disk, etc.). Consequently, the present invention should not be regarded as limited to use with the media storage system 20 for the data cartridge 15 shown and described herein.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A data cartridge detection system, comprising:
   a cartridge engaging assembly for receiving a data cartridge therein;
   a signal emitter positioned adjacent said cartridge engaging assembly to emit a signal; and
   a signal detector mounted to said cartridge engaging assembly to detect said emitted signal when said emitted signal is reflected from the data cartridge, said signal detector generating output to indicate whether said data cartridge is present in said cartridge engaging assembly based on said detected signal.

2. A system as in claim 1, wherein said signal emitter comprises a light source.

3. A system as in claim 1, wherein said signal detector comprises a light detector.

4. A system as in claim 3, wherein said signal detector comprises a lens for focusing said signal onto said light detector.

5. A system as in claim 1, further comprising a processor for receiving said output from said signal detector and determining the presence of said data cartridge in said cartridge engaging assembly based on said received output.

6. A system as in claim 1, wherein said signal emitter is mounted external to said cartridge engaging assembly, and wherein said signal is emitted through an aperture formed in said cartridge engaging assembly for detection by said signal detector therein.

7. A system as in claim 1, further comprising a color-deciphering component operatively associated with said signal detector and with said processor for determining a color of said data cartridge in said cartridge engaging assembly based on said detected signal.

8. A system as in claim 7, wherein said color of said data cartridge corresponds to a type of data cartridge.

9. A system as in claim 1, wherein said signal is reflected from said data cartridge and detected by said signal detector when said data cartridge is present within said cartridge engaging assembly.

10. A system as in claim 1, wherein said signal is shielded from said detector when said cartridge engaging assembly is empty.

11. An apparatus for detecting a data cartridge in a cartridge engaging assembly, comprising:
    a signal emitter positioned adjacent said cartridge engaging assembly; and
    a signal detector mounted to said cartridge engaging assembly to detect a signal from said signal emitter when said signal is reflected from the data cartridge and generate output to indicate whether said data cartridge is present in said cartridge engaging assembly based on said detected signal.

12. An apparatus as in claim 11, wherein said signal emitter comprises a light source.

13. An apparatus as in claim 11, wherein said signal detector comprises a light detector.

14. An apparatus as in claim 11, further comprising a lens for focusing said signal on said detector.

15. An apparatus as in claim 11, wherein said signal detector generates output to indicate at least one characteristic of said data cartridge.

16. An apparatus as in claim 11, further comprising a housing for said cartridge engaging assembly having an aperture formed therein, wherein at least a portion of said signal is emitted through said aperture formed in said housing.

17. An apparatus as in claim 16, wherein said housing shields said signal from said detector when said cartridge engaging assembly is empty.

18. An apparatus as in claim 11, wherein said signal emitter is aligned so that the path of said signal forms an angle of incidence with said data cartridge that results in an angle of reflection directing at least a portion of said signal to said signal detector only when said data cartridge is present within said cartridge.

* * * * *